Patented Apr. 1, 1941

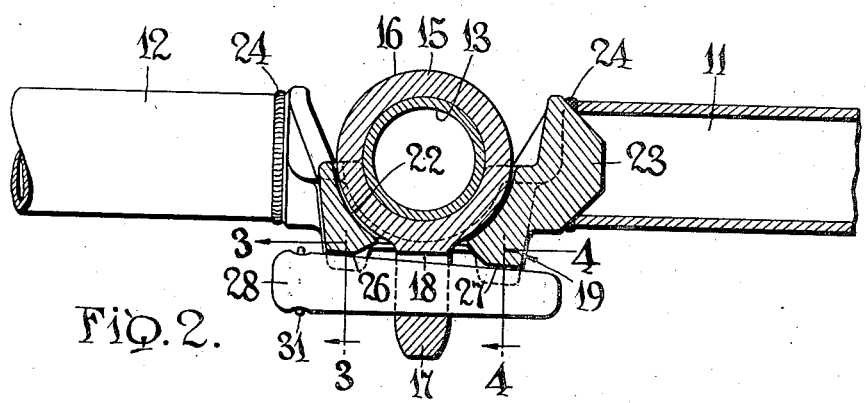
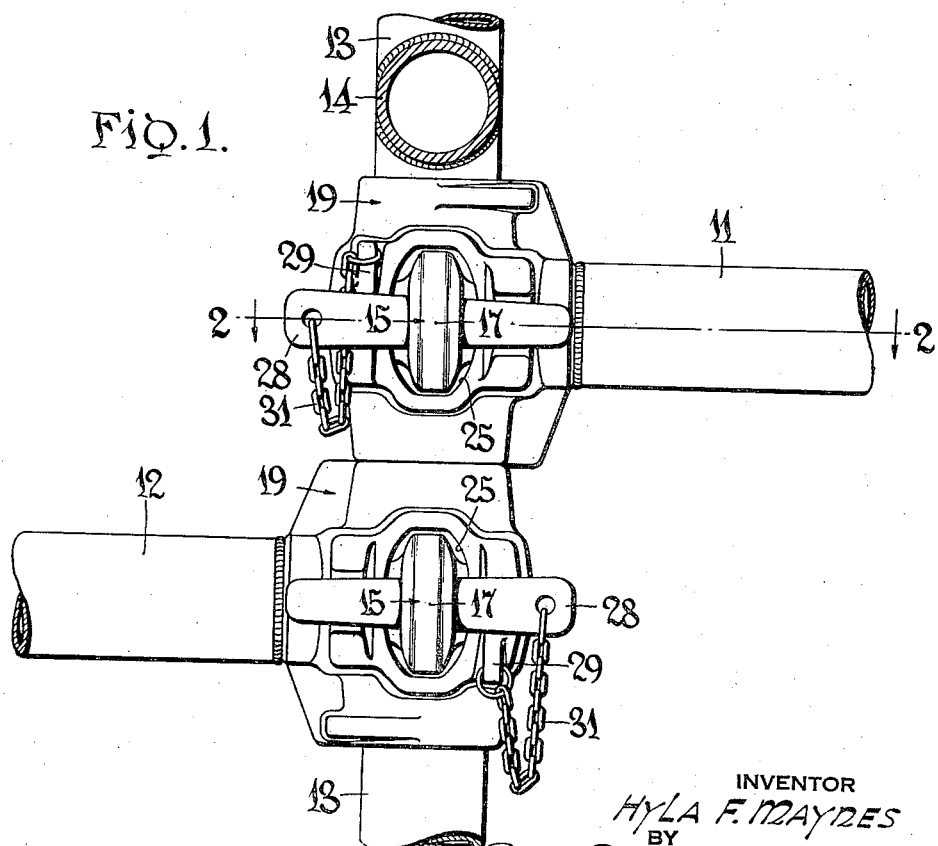

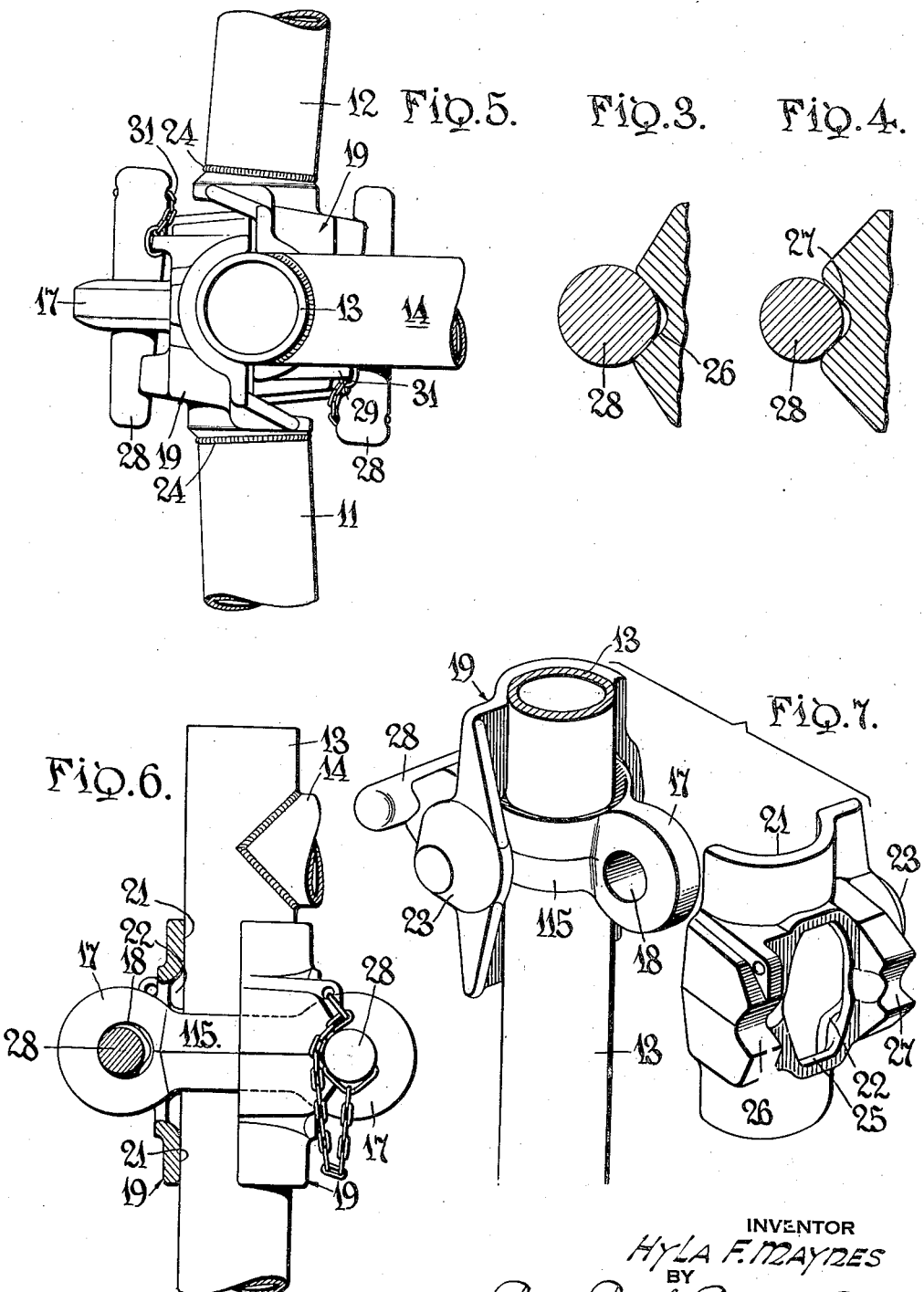

2,236,826

UNITED STATES PATENT OFFICE 2,236,826

KNOCKDOWN SUPPORT

Hyla F. Maynes, North Tonawanda, N. Y., assignor of one-half to Emma C. Maynes, North Tonawanda, N. Y.

Application April 29, 1939, Serial No. 270,838

5 Claims. (Cl. 287—54)

The present invention relates to knockdown supports, and has particular relation to improvements upon the general type of structure disclosed in my Patent No. 1,674,734 granted June 26, 1928.

In structures of this general type, upright and horizontal elements are provided with interlocking parts, including a yoke upon an upright, an apertured member through which the yoke projects upon a horizontal element, and a wedge pin adapted to be entered through the yoke to clamp the apertured member against the upright. The wedge pin has been extended vertically into the yoke, through a tapered opening formed through the latter.

In erecting or taking down structure of this type difficulty has been encountered frequently in connecting two or more horizontal elements, one immediately above the level of another because the wedge pins have not been directly accessible to a driving implement, the adjacent ends of the pins being very close together and in vertical alignment.

Furthermore, in order to secure accurate positioning of a plurality of horizontal elements secured to one upright, it was necessary to accurately form the tapered pin receiving opening in the yoke, and considerable expense attended such formation of such tapered opening.

According to the present invention these and other difficulties are overcome by providing horizontal, aligned, relatively tapered pin receiving recesses on an apertured member which is to be permanently secured to a horizontal element of the structure, and by forming with a straight or untapered bore the pin receiving opening of the yoke which is to be permanently secured to the upright. The pin receiving opening extends horizontally and the pin which it receives is connected to the apertured member by a chain or other flexible connection so arranged that the pin can be entered from only one direction, thereby assuring alignment of the parts.

These and other objects and advantages of the present invention will become apparent from the following description of the typical embodiments of the invention shown in the accompanying drawings, wherein:

Fig. 1 is a front elevation of the fragmentary part of a knockdown structure where two horizontal elements join an upright;

Fig. 2 is a horizontal section taken along line 2—2 of Fig. 1;

Figs. 3 and 4 are fragmentary sectional views taken along lines 3—3 and 4—4, respectively, of Fig. 2;

Fig. 5 is a plan view of another fragmentary portion of a knockdown structure where horizontal elements are joined at the same elevation to an upright, the latter having a double yoke;

Fig. 6 is a side elevation of the structure shown in Fig. 5, parts being broken away and appearing in section; and, Fig. 7 is a perspective view of the structure illustrated in Figs. 5 and 6, with the horizontal elements omitted and one of the apertured members detached from the yoke.

The knockdown structure shown in Figs. 1 and 2 includes horizontal elements 11 and 12 of tubular form detachably joined to an upright 13, likewise tubular, and a horizontal element 14 transverse to elements 11 and 12 joined to the upright. Permanently secured to the upright 13, preferably by welding, are yokes 15, one for each horizontal element, the yokes each consisting of a collar 16 about the upright and an ear 17 projecting from the collar. Each ear has a straight, untapered bore 18 formed therethrough, preferably parallel to horizontal elements 11 and 12.

Permanently secured to the ends of the elements 11 and 12 are members 19, each of which has a semi-cylindrical face 21 (see Figs. 6 and 7) for seating upon the upright 13, the face 21 being recessed as indicated at 22 for receiving a collar 16, and an aperture 25 for receiving the ear 17 of the associated yoke. An abutment 23, preferably of generally conical form, is provided upon each member 19 for joining, by welding 24, to a horizontal element 11 or 12.

The outer face of each member 19 is provided with horizontally aligned recesses 26 and 27 on opposite sides of the aperture 25, for seating a tapered wedge pin 28 when the latter is driven through the bore 18 of the adjacent yoke part or ear 17. As shown in Figs. 2, 3 and 4 the recesses 26 and 27 are relatively tapered, recess 27 being more shallow than recess 26, in correspondence with the taper of the wedge pin so that the outer edge of the latter (the lower edge as the parts appear in Fig. 2) will be parallel to the bore 18 and engage the outer surface of it (the lower line of bore 18 as shown in Fig. 2).

In order to insure entry of pin 28 into the bore 18 from the correct side, the pin is joined to a flange 29 on the side of the member 19 nearest recess 26 by a flexible element, such as chain 31, which is short enough to prevent entry of the pin from the opposite direction.

By the relationship of parts illustrated and described it will be apparent that positive alignment and interchangeability of the parts is obtained without necessity of resort to complex machining operations.

It will be understood that by arranging the bores 18 substantially parallel to the horizontal members, direct access may be had to the pins 28, for driving them into place or removing them, notwithstanding that one element 19 may be directly above another as in Fig. 1, or closely adjacent a horizontal member such as 14 in Figs. 1 and 5.

By this arrangement of parts, each pin 28, when driven into place, will correctly align the associated horizontal and vertical elements, causing the ear 17 to be disposed centrally of the aperture 25 in the adjacent member 19.

In instances, such as illustrated in Figs. 1 and 2 where horizontal elements 11 and 12 are parallel, in vertically offset relation to each other, they will also be parallel to the bore 18. Or, if horizontal elements 11 and 12 are angularly related, and in vertically offset relation, as may occur for example when building a circular structure, each element may nevertheless be parallel to the bore 18 of the associated yoke 15, the latter being secured to the upright elements so as to compensate for the angular relation of elements 11 and 12.

In other instances, however, it may be desirable to arrange horizontal elements 11 and 12 at the same level, and in this event double yokes 115 may be provided as shown in Figs. 5, 6 and 7, each yoke having two ears 17, one on each side thereof, each for cooperating with a member 19 secured to one of elements 11 and 12. In such instances, when the elements 11 and 12 are angularly related, as shown in Fig. 5, the horizontal elements are welded onto abutments 23 in angular relation, the substantially conical form of the abutments adapting them for such relation.

It will be understood that the embodiments herein shown and described are merely illustrative of the inventive principles involved and that these principles may be otherwise embodied without departing from the spirit of the invention or the scope of the appended claims.

I claim:

1. A knockdown support, comprising an upright, a projection thereon having a straight horizontal opening therethrough having a uniform bore, a horizontal element having a member thereon with a face receiving the upright and an aperture for receiving said projection, and a tapered pin adapted to enter the opening to clamp the member against the upright, said member having tapered recesses on opposite sides of the aperture complemental to the taper of the pin for seating the pin.

2. In a knockdown support, the combination of an upright element and a horizontal element, a member secured to the upright element and a member secured to the horizontal element, one of said members having a projection with a straight opening therethrough extending transversely to the element to which the member is secured, the other of said members having an aperture for receiving said projection and relatively tapered pin seating recesses on opposite sides of the aperture, and a tapered pin for entering the opening in the projection and said seating recesses to clamp together the upright element and the horizontal element.

3. In a knockdown support, a member having a concave face for seating upon a tubular element and a substantially conical abutment for being secured to the end of another tubular element disposed transversely to the first mentioned tubular element, said member having an aperture therethrough, a member adapted to be secured to the first mentioned tubular element and having a projection adapted to extend through said aperture, said projection having an opening therethrough substantially transverse to the first mentioned tubular element, and a wedge pin for entering said opening to clamp the first mentioned member and element together.

4. In a knockdown support, a member having a concave face for seating upon a tubular element and an abutment for being secured to the end of another tubular element disposed transversely of the first mentioned element, said member having an aperture therethrough, a member adapted to be secured to the first mentioned element and having a projection adapted to extend through said aperture, said projection having a straight opening therethrough, and a tapered wedge pin for entering said opening, the first mentioned member having relatively tapered recesses on opposite sides of the aperture for seating said tapered wedge pin.

5. In a knockdown support, the combination of an upright, a projection thereon having a straight horizontal opening therethrough, a horizontal element having a member thereon with a face receiving the upright and an aperture for receiving the projection, and a tapered wedge pin adapted to enter the opening to clamp the member against the upright, said member having relatively tapered recesses on opposite sides of the aperture for seating the pin, and a flexible connection between the pin and said member so arranged that the pin can enter said opening from one side only of said member.

HYLA F. MAYNES.